US008180836B2

(12) United States Patent
Takahashi (10) Patent No.: US 8,180,836 B2
(45) Date of Patent: May 15, 2012

(54) INFORMATION PROCESSING APPARATUS

(75) Inventor: Shinya Takahashi, Hino (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 890 days.

(21) Appl. No.: 11/606,871

(22) Filed: Nov. 30, 2006

(65) Prior Publication Data

US 2008/0065731 A1    Mar. 13, 2008

(30) Foreign Application Priority Data

Sep. 8, 2006    (JP) ................................ P2006-244546

(51) Int. Cl.
*G06F 15/16* (2006.01)
(52) U.S. Cl. ........ 709/206; 709/204; 709/207; 455/412; 455/466; 713/150
(58) Field of Classification Search .......... 709/204–207; 455/412, 466; 713/150
See application file for complete search history.

(56) References Cited

U.S. PATENT DOCUMENTS

| | | | | |
|---|---|---|---|---|
| 6,442,595 | B1 * | 8/2002 | Kelly ............................ | 709/206 |
| 6,462,752 | B1 * | 10/2002 | Ma et al. ...................... | 345/684 |
| 6,642,945 | B1 * | 11/2003 | Sharpe ......................... | 715/788 |
| 6,690,365 | B2 * | 2/2004 | Hinckley et al. ............. | 345/173 |
| 7,243,127 | B2 * | 7/2007 | Tabayoyon et al. .......... | 709/206 |
| 7,353,258 | B2 * | 4/2008 | Washburn .................... | 709/206 |
| 7,657,736 | B2 * | 2/2010 | Godfrey et al. .............. | 713/150 |
| 7,792,913 | B2 * | 9/2010 | Chen ............................ | 709/206 |
| 2001/0006889 | A1 * | 7/2001 | Kraft ............................ | 455/412 |
| 2002/0002589 | A1 * | 1/2002 | Yonenaga et al. ........... | 709/206 |
| 2002/0085535 | A1 * | 7/2002 | Williams ..................... | 370/352 |
| 2002/0140723 | A1 * | 10/2002 | Ageta et al. .................. | 345/727 |
| 2002/0188690 | A1 * | 12/2002 | Lee .............................. | 709/206 |
| 2003/0041114 | A1 * | 2/2003 | Murakami et al. ........... | 709/206 |
| 2003/0093483 | A1 * | 5/2003 | Allen et al. .................. | 709/207 |

(Continued)

FOREIGN PATENT DOCUMENTS

JP    2001-117831 A    4/2001

(Continued)

OTHER PUBLICATIONS

Japanese Office Action dated Jul. 28, 2009 (4 pages), and English translation thereof (8 pages), issued in counterpart Japanese Application Serial No. 2006-244546.

(Continued)

*Primary Examiner* — Wing Chan
*Assistant Examiner* — Razu Miah
(74) *Attorney, Agent, or Firm* — Maschoff Gilmore & Israelsen (57) ABSTRACT

An information processing apparatus for communicating a communication apparatus, includes: a transmitting unit configured to transmit a plurality of transmission mails to the communication apparatus; a receiving unit configured to receive a plurality of reception mails from the communication apparatus; an extracting unit configured to extract at least one of the plurality of transmission mails and the plurality of reception mails with respect to a specified other user from the plurality of the transmission mails and the plurality of the reception mails; a creating unit configured to create a list screen, in which at least one of the plurality of transmission mails and the plurality of reception mails are arranged, by using at least one of the plurality of transmission mails and the plurality of reception mails with respect to the specified other user extracted by the extracting unit; and a display unit configured to display the list screen created by the creating unit.

10 Claims, 8 Drawing Sheets

U.S. PATENT DOCUMENTS

| | | | |
|---|---|---|---|
| 2003/0158724 A1* | 8/2003 | Uchida | 704/7 |
| 2003/0177191 A1* | 9/2003 | Kawashima et al. | 709/206 |
| 2004/0024827 A1* | 2/2004 | Yoshimura | 709/206 |
| 2004/0064446 A1* | 4/2004 | Fujimura | 707/3 |
| 2004/0066403 A1* | 4/2004 | Nagata et al. | 345/748 |
| 2004/0068543 A1* | 4/2004 | Seifert | 709/206 |
| 2004/0110491 A1* | 6/2004 | Ozaki | 455/412.1 |
| 2004/0196500 A1* | 10/2004 | Ichiki | 358/1.15 |
| 2004/0203959 A1* | 10/2004 | Coombes | 455/466 |
| 2005/0193082 A1* | 9/2005 | Burns | 709/213 |
| 2005/0195446 A1* | 9/2005 | Kasatani | 358/402 |
| 2005/0267944 A1* | 12/2005 | Little, II | 709/207 |
| 2005/0283364 A1* | 12/2005 | Longe et al. | 704/257 |
| 2006/0031334 A1* | 2/2006 | Kim | 709/206 |
| 2006/0047765 A1* | 3/2006 | Mizoi et al. | 709/206 |
| 2006/0101337 A1* | 5/2006 | Sakata | 715/705 |
| 2006/0265457 A1* | 11/2006 | Ueyama | 709/206 |
| 2006/0270461 A1* | 11/2006 | Won et al. | 455/566 |
| 2007/0067401 A1* | 3/2007 | Kamata et al. | 709/206 |
| 2007/0073714 A1* | 3/2007 | Kawakami et al. | 707/10 |
| 2008/0046824 A1* | 2/2008 | Li et al. | 715/739 |

FOREIGN PATENT DOCUMENTS

| | | |
|---|---|---|
| JP | 2003-099374 A | 4/2003 |
| JP | 2003-111145 A | 4/2003 |
| JP | 2004-178459 A | 6/2004 |
| JP | 2005-228255 A | 8/2005 |

OTHER PUBLICATIONS

Japanese Office Action dated Dec. 8, 2009 and English translation thereof issued in a counterpart Japanese Application No. 2006-244546.

* cited by examiner

♂ HI, WHAT ARE YOU DOING?
♀ I'M WORKING
♂ OK, TALK TO YOU LATER
♀ SORRY
♀ HI, I WAS SORRY LAST TIME. WHAT DAY?
♂ NOTHING, I WAS JUST KILLING TIME.
♀ OK
♂ HI
♀ I'M SLEEPY
♀ TAKE CARE
♂ HI, WHAT ARE YOU DOING?
♀ I'M AT KARAOKE
♂ I'M WORKING NIGHTS SO I DON'T GO HOME. TOMORROW WHAT IS YOUR SCHEDULE?
♀ UM·····m(__)m
♀ NEXT WEEKEND I HAVE TIME. WHAT DO YOU WANT TO DO FOR FUN?

♂ HI, WHAT ARE YOU DOING?
♀ I'M AT KARAOKE
♂ I'M WORKING NIGHTS SO I DON'T GO HOME. TOMORROW WHAT IS YOUR SCHEDULE?
♀ UM·····m(__)m
♀ NEXT WEEKEND I HAVE TIME. WHAT DO YOU WANT TO DO FOR FUN?

~51

I'M GOING TO ■

~52

PARTY . , ?
 !

♀ I'M AT KARAOKE
♂ I'M WORKING NIGHTS SO I DON'T GO HOME. TOMORROW WHAT IS YOUR SCHEDULE?
♀ UM·····m(__)m
♀ NEXT WEEKEND I HAVE TIME. WHAT DO YOU WANT TO DO FOR FUN?
♂ AH, I DON'T MAKE TIME

~51

SO, I ■

~52

WANT . , ?
 !

♀ I'M AT KARAOKE
♂ I'M WORKING NIGHTS SO I DON'T GO HOME. TOMORROW WHAT IS YOUR SCHEDULE?
♀ UM·····m(__)m
♀ NEXT WEEKEND I HAVE TIME. WHAT DO YOU WANT TO DO FOR FUN?
♂ AH, I DON'T MAKE TIME

~51

SO, I

~52

WANT TO

INFORMATION PROCESSING APPARATUS

CROSS-REFERENCE TO RELATED APPLICATIONS

This application is based on and claims the benefit of priority from the prior Japanese Patent Application No. 2006-244546, filed on Sep. 8, 2006; the entire contents of which are incorporated herein by reference.

TECHNICAL FIELD

The present invention relates to an information processing apparatus, and in particular, to an information processing apparatus that enables transmission and reception of a mail.

BACKGROUND

Description of Related Art

In recent years, a cellular phone as an information processing apparatus has various functions, a directory function, a mail function through a base station or a network, such as Internet, an a browser function capable of reading Web pages, in addition to a communication function by a simple telephone call.

In particular, there is known a technology that enables two users having different cellular phones to have a chat using a mail function (for example, see JP-A-2003-111145).

According to JP-A-2003-111145, a transmission mail and a reception mail are arranged on a chat screen in an order of transmission and reception timing. Then, on the chat screen, a user's icon is displayed at the head of the transmission mail, and an icon of a person to chat is displayed at the head of the reception mail. Accordingly, upon chatting, transmission and reception mails can be easily distinguished.

SUMMARY

According to an aspect of the invention, there is provided an information processing apparatus for communicating a communication apparatus, including: a transmitting unit configured to transmit a plurality of transmission mails to the communication apparatus; a receiving unit configured to receive a plurality of reception mails from the communication apparatus; an extracting unit configured to extract at least one of the plurality of transmission mails and the plurality of reception mails with respect to a specified other user from the plurality of the transmission mails and the plurality of the reception mails; a creating unit configured to create a list screen, in which at least one of the plurality of transmission mails and the plurality of reception mails are arranged, by using at least one of the plurality of transmission mails and the plurality of reception mails with respect to the specified other user extracted by the extracting unit; and a display unit configured to display the list screen created by the creating unit.

DESCRIPTION OF THE EMBODIMENTS

Hereinafter, an embodiment of the invention will be described with reference to the drawings.

Figure 1A:
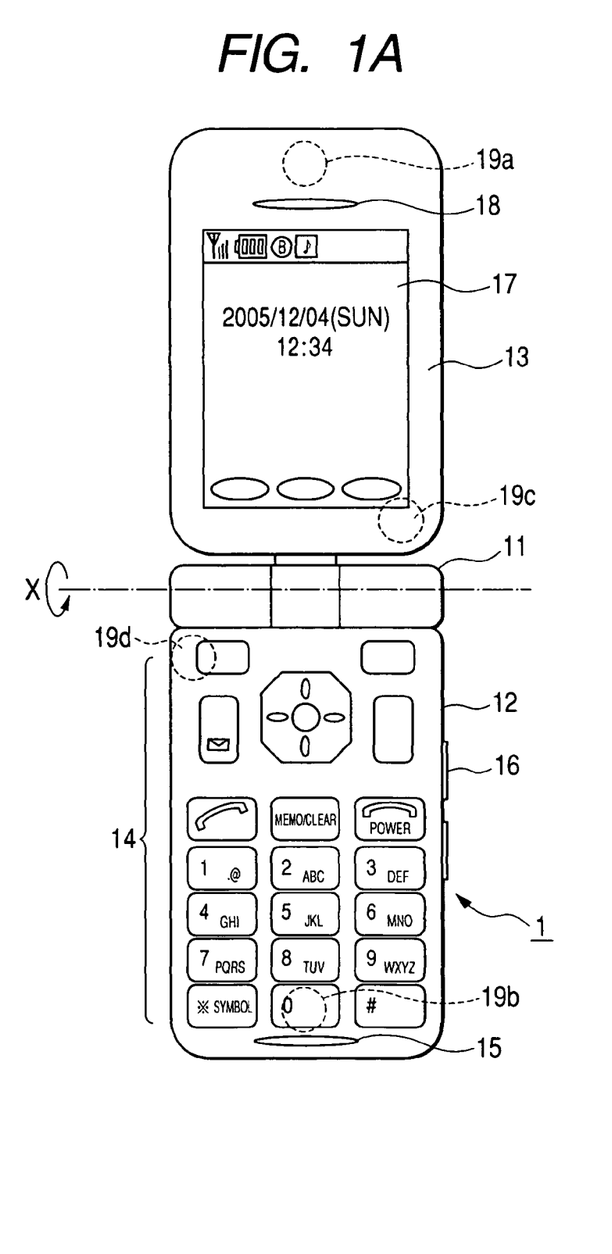
FIGS. 1A and 1B are an exemplary exterior views showing an exterior structure of a camera-equipped digital cellular phone.
Figure 1B:
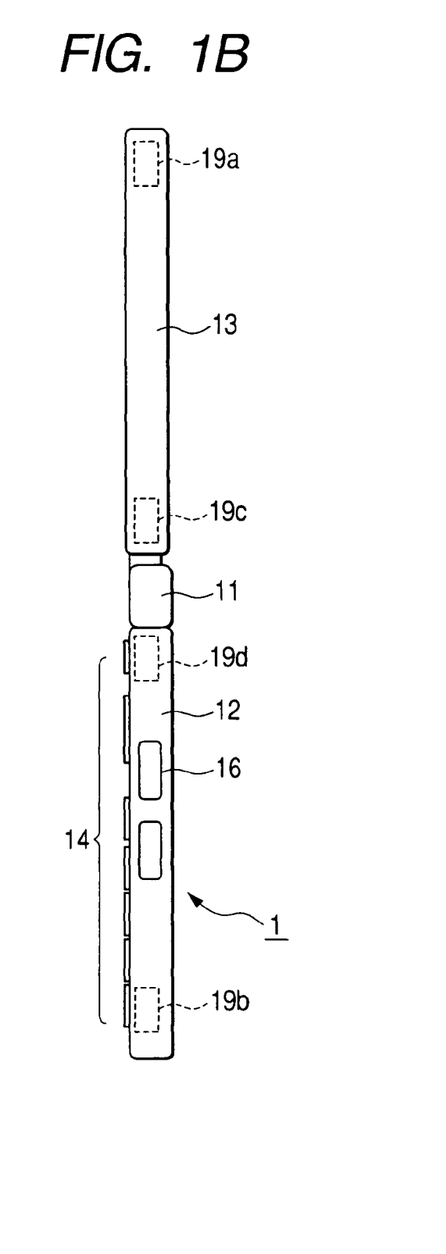

FIGS. 1A and 1B show the exterior structure of a camera-equipped digital cellular phone 1 that can be applied as an information processing apparatus according to the invention. Moreover, FIG. 1A shows the exterior structure of the camera-equipped digital cellular phone 1 in a state where it is unfolded 180 degrees as viewed from the front surface. FIG. 1B shows the exterior structure in a state where it is unfolded 180 degrees as viewed from the side surface.

As shown in FIGS. 1A and 1B, in the camera-equipped digital cellular phone 1, a first casing 12 and a second casing 13 are hinged by a hinge 11 at its central portion. The camera-equipped digital cellular phone 1 is formed to be foldable in a direction of an arrow X through the hinge 11. An antenna (an antenna 44 of FIG. 3 described below) for transmission/reception is provided at a predetermined position in the camera-equipped digital cellular phone 1. With the internal antenna, the camera-equipped digital cellular phone 1 transmits and receives an electrical wave to and from a base station (not shown).

On a surface of the first casing 12, operating keys 14, such as numeric keys of '0' to '9', a call key, a redial key, an end/power key, a clear key, an electronic mail key, and the like, are provided. Various instructions can be input using the operating keys 14.

At an upper portion of the first casing 12, a directional key and an enter key are also provided as operating keys 14. A user operates the directional key in a vertical or horizontal direction, thereby moving a cursor in the vertical or horizontal direction. Specifically, various operations, such as a scroll operation of a directory or an electronic mail displayed on a liquid crystal display 17 provided in the second casing 13, are executed, a page rolling operation of a simplified home page, and a forward operation of an image.

Further, by pushing the enter key, various functions can be decided. For example, according to the operation of the directional key in the first casing 12 by the user, a desired telephone number is selected among a plurality of telephone numbers of the directory displayed on the liquid crystal display 17. Then, when the enter key is pushed in an inner direction of the first casing 12, the selected telephone number is decided, and then a call request processing of the telephone number is performed.

Further, in the first casing 12, an electronic mail key is provided on a left side of the directional key and the enter key. If the electronic mail key is pushed in the inner direction of the first casing 12, a mail transmission/reception function can be called. On a right side of the directional key and the enter key, a browser key is provided. If the browser key is pushed in the inner direction of the first casing 12, data of Web pages can be read. Moreover, the electronic mail key and the browser key provided the left and right sides of the directional key and the enter key have various functions, such as 'Yes' and 'No', according to a screen to be displayed on the liquid crystal display 17, and thus they are called a soft 1 key and a soft 2 key, respectively.

In addition, in the first casing 12, a microphone 15 is provided below the operating keys 14. With the microphone 15, a user's voice during calling is collected. Further, in the first casing 12, a side key 16 that operates the camera-equipped digital cellular phone is provided.

Moreover, a battery pack (not shown) is provided at a rear surface of the first casing 12. If the end/power key becomes an ON state, power is supplied to individual circuits from the battery pack, such that the camera-equipped digital cellular phone 1 starts to operate.

In the first casing 12, a memory card slot into which a removable memory card (a memory card 46 of FIG. 3 described below) is inserted is provided at a predetermined position at a lower portion of the first casing 12. If a memo button (not shown) is pushed, a voice of a person to call during calling can be recorded in the memory card, and an electronic mail, a simplified home page, and an image captured by a CCD camera can be recorded according to an operation of the user.

Here, the memory card is a kind of a flash memory card, such as a NAND flash memory or a NOR flash memory. The memory card is formed by incorporating a flash memory device, which is an electrically rewritable or erasable non-volatile memory, in a small and thin plastic case. In such a memory card, various kinds of data, such as image, sound, and music can be rewritten and read out through a ten-pin terminal.

Further, the memory card uses a unique serial protocol that can secure comparability with an apparatus to be used even though the specification of an internal flash memory changes according to large capacity, thereby implementing high-speed performance. Further, with an erroneous erasure preventing switch, high reliability can be secured.

Accordingly, the camera-equipped digital cellular phone 1 is configured such that such a memory card can be inserted thereinto, and thus data sharing with other electronic apparatuses can be realized through the memory card.

In addition, since a module (chip) for expanding a predetermined function may be incorporated in the memory card, and the memory card may be installed in on the memory card slot (not shown), the function of the camera-equipped digital cellular phone 1 can be further expanded.

For example, a memory card, into which a noncontact IC (Integrated Circuit) chip is incorporated, may be mounted on the camera-equipped digital cellular phone 1. Accordingly, even though the noncontact IC chip is not incorporated into the camera-equipped digital cellular phone 1, the camera-equipped digital cellular phone 1 can be expanded to have an electronic payment function, like a case where the noncontact IC chip is incorporated.

Meanwhile, the liquid crystal display 17 (a main display) is provided at a front surface of the second casing 13. On the liquid crystal display 17, in addition to a reception state of an electrical wave, a residual battery charge, the name or telephone number of a person to call or a telephone number registered in the directory, and a transmission history, the content of an electronic mail, a simplified home page, an image captured by the CCD (Charge Coupled Device) camera (a CCD camera 20 of FIG. 2 described below), contents received by an external contents server (not shown), and contents stored in the memory card (a memory card 46 of FIG. 3 described below) are displayed. Further, a speaker 18 is provided at a predetermined position above the liquid crystal display 17. With the speaker 18, the user can perform a voice call.

At predetermined positions in the first casing 12 and the second casing 13, magnetic sensors 19*a*, 19*b*, 19*c*, and 19*d* are provided so as to detect the state of the camera-equipped digital cellular phone 1.

Figure 2A:
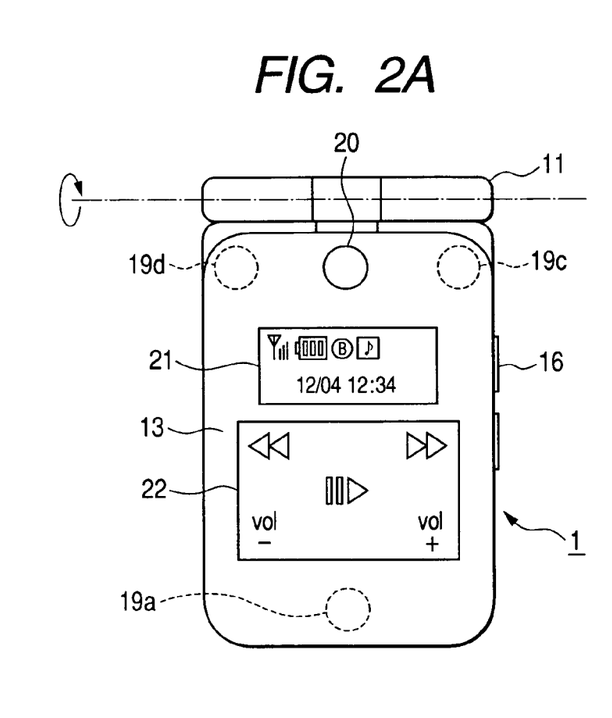
FIGS. 2A and 2B are an exemplary exterior views showing another exterior structure of a camera-equipped digital cellular phone.
Figure 2B:
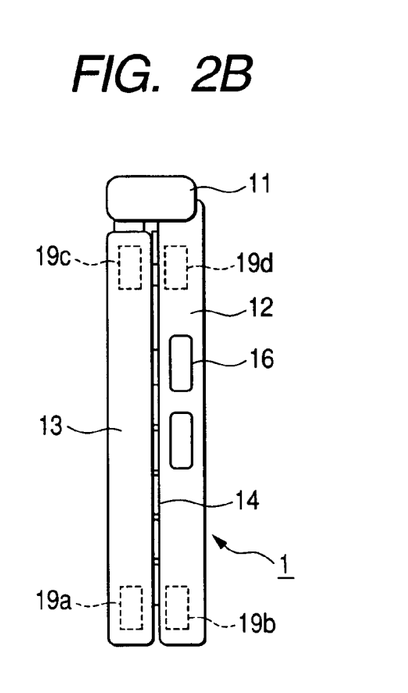

FIGS. 2A and 2B show another exterior structure of the camera-equipped digital cellular phone 1. The state of the camera-equipped digital cellular phone 1 shown in FIG. 2 is a state that rotated in the direction of the arrow X from the state of the camera-equipped digital cellular phone 1 shown in FIG. 1. Moreover, FIG. 2A shows the exterior structure of the camera-equipped digital cellular phone 1 in a state where it is folded as viewed from the front surface. FIG. 2B shows the exterior structure of the camera-equipped digital cellular phone 1 in a state where it is folded as viewed from the side surface.

The CCD camera 20 is provided at an upper portion of the second casing 13. With the CCD camera 20, a desired subject can be captured. Below the CCD camera 20, a sub display 21 is provided. On the sub display 21, an antenna pictograph indicating a current sensitivity level of the antenna, a battery pictograph indicating a current residual battery charge of the camera-equipped digital cellular phone 1, and a current time are displayed.

An electrostatic touch pad 22 is provided below the sub display 21. The electrostatic touch pad 22 has a single touch pad in appearance, but has a plurality of sensors (not shown). If the user touches the vicinity of a sensor, it is detected by the sensor, and then a rewind operation, a fast forward operation, a volume down operation, a volume up operation, a play operation, and a pause operation are executed.

Figure 3:
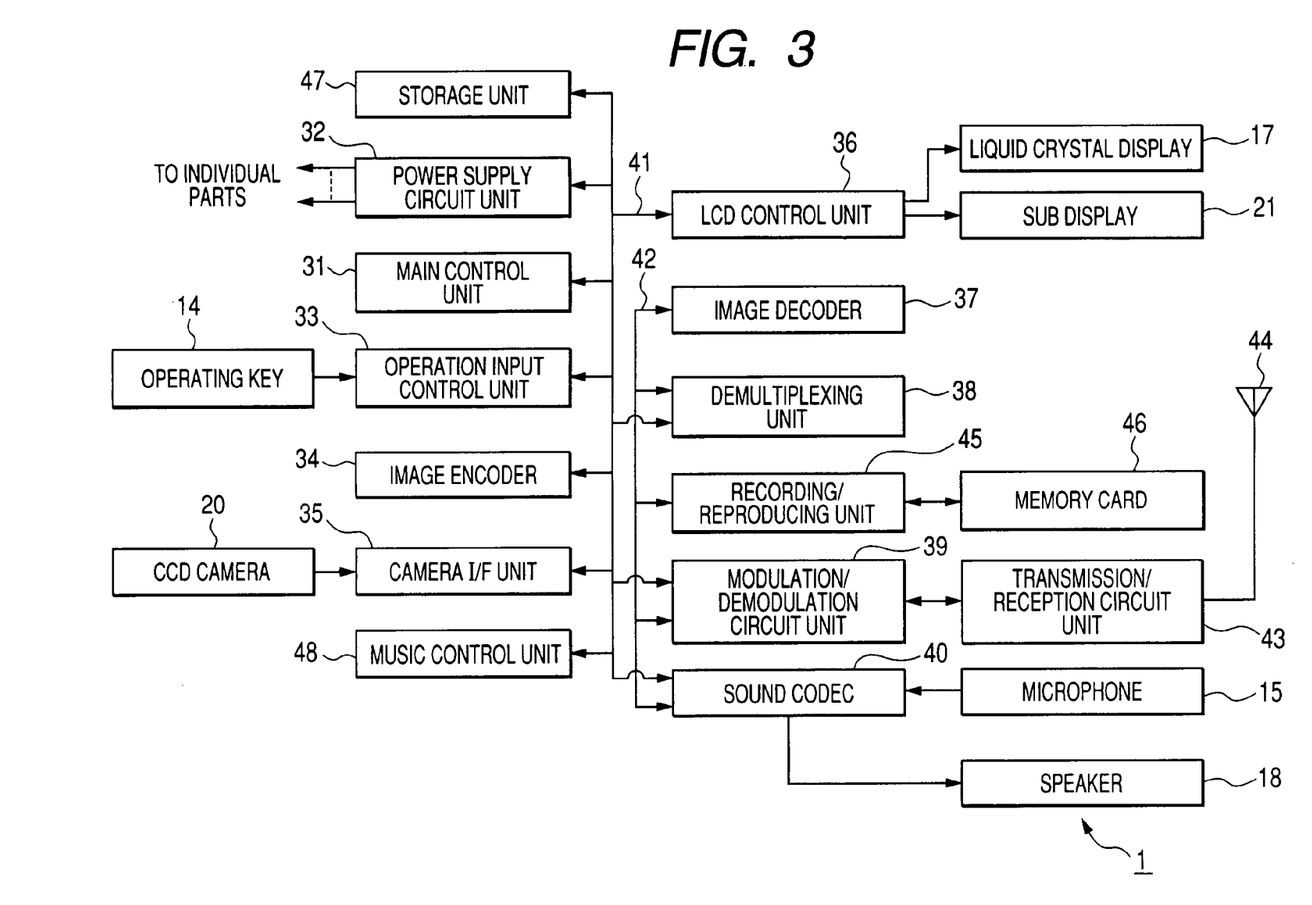
FIG. 3 is an exemplary block diagram showing the internal structure of a camera-equipped digital cellular phone.

FIG. 3 shows the internal structure of the camera-equipped digital cellular phone 1.

As shown in FIG. 3, in the camera-equipped digital cellular phone 1, a power supply circuit unit 32, an operation input control unit 33, an image encoder 34, a camera interface unit 35, an LCD (Liquid Crystal Display) control unit 36, a demultiplexing unit 38, a modulation/demodulation circuit unit 39, a sound codec 40, a storage unit 47, and a music control unit 48 are connected to one another with respect to a main control unit 31, which performs an overall control of individual parts of the first casing 12 and the second casing 13, through a main bus 41. Further, the image encoder 34, an image decoder 37, the demultiplexing unit 38, the modulation/demodulation circuit unit 39, the sound codec 40, and a recording/reproducing unit 45 are connected to one another through a synchronous bus 42.

When the end/power key becomes the ON state by the operation of the user, the power supply circuit unit 32 supplies power from the battery pack to the individual parts, such that the camera-equipped digital cellular phone 1 starts to operate.

The main control unit 31 has a CPU (Central Processing Unit), a ROM (Read Only Memory), and a RAM (Random Access Memory), and the like. The CPU executes various kinds of processing according to programs stored in the ROM or various application programs loaded on the ROM from the storage unit 47, generates various control signals, and supplies the control signals to the individual parts so as to perform the overall control of the camera-equipped digital cellular phone 1. The RAM appropriately stores data required for executing various kinds of processing.

Moreover, a timer that accurately measures current date and time is incorporated into the main control unit 31.

Here, various application programs to be executed by the CPU may be installed in the ROM or the storage unit 47 in advance. Further, various application programs to be executed by the CPU may be downloaded to the camera-equipped digital cellular phone 1 by communication through a base station (not shown) and installed in the storage unit 47. In addition, various application programs to be executed by the CPU may be stored in the memory card 46. In this case, the application programs may be read out by the recording/reproducing unit 45 and installed in the storage unit 47.

The camera-equipped digital cellular phone 1 converts and compresses a sound signal collected by the microphone 15 in a voice call mode into a digital sound signal using the sound codec 40 on the basis of the control of the main control unit 31, and performs a spread spectrum processing on the converted and compressed digital sound signal using the modulation/demodulation circuit unit 39. Then, the camera-equipped digital cellular phone 1 performs a digital-to-analog conversion processing and a frequency conversion processing on the digital signal subject to the spread spectrum processing using the transmission/reception circuit unit 43 and then transmits the processed signal through the antenna 44.

Further, the camera-equipped digital cellular phone 1 amplifies a reception signal received by the antenna 44 in the voice call mode, and performs a frequency conversion processing and an analog-to-digital conversion processing on the reception signal. Then, the camera-equipped digital cellular phone 1 performs a de-spread spectrum processing on the processed reception signal using the modulation/demodulation circuit unit 39, expands the signal subject to the de-spread spectrum processing using the sound codec 40, converts the signal into an analog sound signal, and outputs the converted analog sound signal through the speaker 18.

In addition, when transmitting an electronic mail in a data communication mode, the camera-equipped digital cellular phone 1 sends text data of the electronic mail input by the operation of the operating keys 14 to the main control unit 31 through the operation input control unit 33. The main control unit 31 performs a spread spectrum processing on the text data using the modulation/demodulation circuit unit 39, performs a digital-to-analog conversion processing and a frequency conversion processing using the transmission/reception circuit unit 43, and transmits the processed data to the base station (not shown) through the antenna 44.

In contrast, when receiving an electronic mail in the data communication mode, the camera-equipped digital cellular phone 1 restores original text data by performing a de-spread spectrum processing on the reception signal received from the base station (not shown) through the antenna 44 using the modulation/demodulation circuit unit 39, and displays the restored text data on the liquid crystal display 17 through the LCD control unit 36 as an electronic mail.

Next, the camera-equipped digital cellular phone 1 may record the received electronic mail in the memory card 46 through the recording/reproducing unit 45 according to the operation of the user.

When an image signal is not transmitted, the camera-equipped digital cellular phone 1 directly displays an image signal captured by the CCD camera 20 on the liquid crystal display 17 through the camera interface unit 35 and the LCD control unit 36.

When the image signal is transmitted in the data communication mode, the camera-equipped digital cellular phone 1 supplies the image signal captured by the CCD camera 20 to the image encoder 34 through the camera interface unit 35.

The image encoder 34 compresses and encodes the image signal supplied from the CCD camera 20 according to a predetermined encoding system, such as MPEG (Moving Picture Experts Group) 4 or the like, so as to convert the image signal into a coded image signal, and sends the converted coded image signal to the demultiplexing unit 38. Simultaneously, the camera-equipped digital cellular phone 1 sends sound collected by the microphone 15 during image capturing by the CCD camera 20 to the demultiplexing unit 38 through the sound codec 40 as a digital sound signal.

The demultiplexing unit 38 demultiplexes the coded image signal supplied from the image encoder 34 and the sound signal supplied from the sound codec 40 according to a predetermined method, and performs a spread spectrum processing on the resultant demultiplexed signal using the modulation/demodulation circuit unit 39. Then, the camera-equipped digital cellular phone 1 performs a digital-to-analog conversion processing and a frequency conversion processing on the signal subject to the spread spectrum processing using the transmission/reception circuit unit 43 and transmits the processed signal through the antenna 44.

In contrast, in the data communication mode, the camera-equipped digital cellular phone 1 may receive data of a Web page.

That is, in the camera-equipped digital cellular phone 1, in the data communication mode, if data for requesting the Web page is received, the data of the Web page is transmitted through the base station (not shown) according to the request. The data of the Web page is received by the transmission/reception circuit unit 43 and the modulation/demodulation circuit unit 39 through the antenna 44. The transmission/reception circuit unit 43 and the modulation/demodulation circuit unit 39 sends the received data of the Web page to the main control unit 31.

The main control unit 31 analyzes the data of the Web page and creates a screen (image) based on the analysis. The created screen is supplied from the main control unit 31 to the liquid crystal display 17 through the LCD control unit 36 and then displayed on the liquid crystal display 17. That is, at least an application program of a Web browser is installed in the ROM of the main control unit 31 or the storage unit 47. Then, the CPU of the main control unit 31 functions a Web browser by executing the application program of the Web browser on the RAM and analyzes the data of the Web page.

Further, for example, when data of a motion picture file linked to the Web page is received in the data communication mode, the camera-equipped digital cellular phone 1 performs a de-spread spectrum processing on a reception signal received from the base station (not shown) through the antenna 44 using the modulation/demodulation circuit unit 39, and sends the resultant multiplexed signal to the demultiplexing unit 38.

The demultiplexing unit 38 separates the multiplexed signal into the coded image signal and the sound signal, and supplies the coded image signal and the sound signal to the image decoder 37 and the sound codec 40 through the synchronous bus 42, respectively. The image decoder 37 decodes the coded image signal by a decoding system corresponding to a predetermined encoding system, such as MPEG 4 or the like, so as to generate a reproduction motion picture signal and supplies the reproduction motion picture signal to the liquid crystal display 17 through the LCD control unit 36. Accordingly, for example, motion picture data in the motion picture file linked to the Web page or the like is displayed.

Simultaneously, the sound codec 40 converts the sound signal into an analog sound signal and then supplies the converted analog sound signal to the speaker 18. Accordingly, for example, the sound signal in the motion picture file linked to the Web page or the like is reproduced. In this case, like the electronic mail, the camera-equipped digital cellular phone 1 may also record the data linked to the received Web page or the like in the memory card 46 through the recording/reproducing unit 45 according to the operation of the user.

The storage unit 47 has, for example, a flash memory that is an electrically rewritable or erasable nonvolatile memory. The storage unit 47 stores various application programs that are executed by the CPU of the main control unit 31 or various groups of data. Further, if necessary, the storage unit 47 may store the received electronic mail or the motion picture data in the motion picture file linked to the received Web page according to the operation of the user.

The music control unit 48 controls the execution of a play operation and a pause operation, a rewind operation, a fast forward operation, a volume down operation, and a volume up operation of audio data stored in the storage unit 47.

Figure 4:
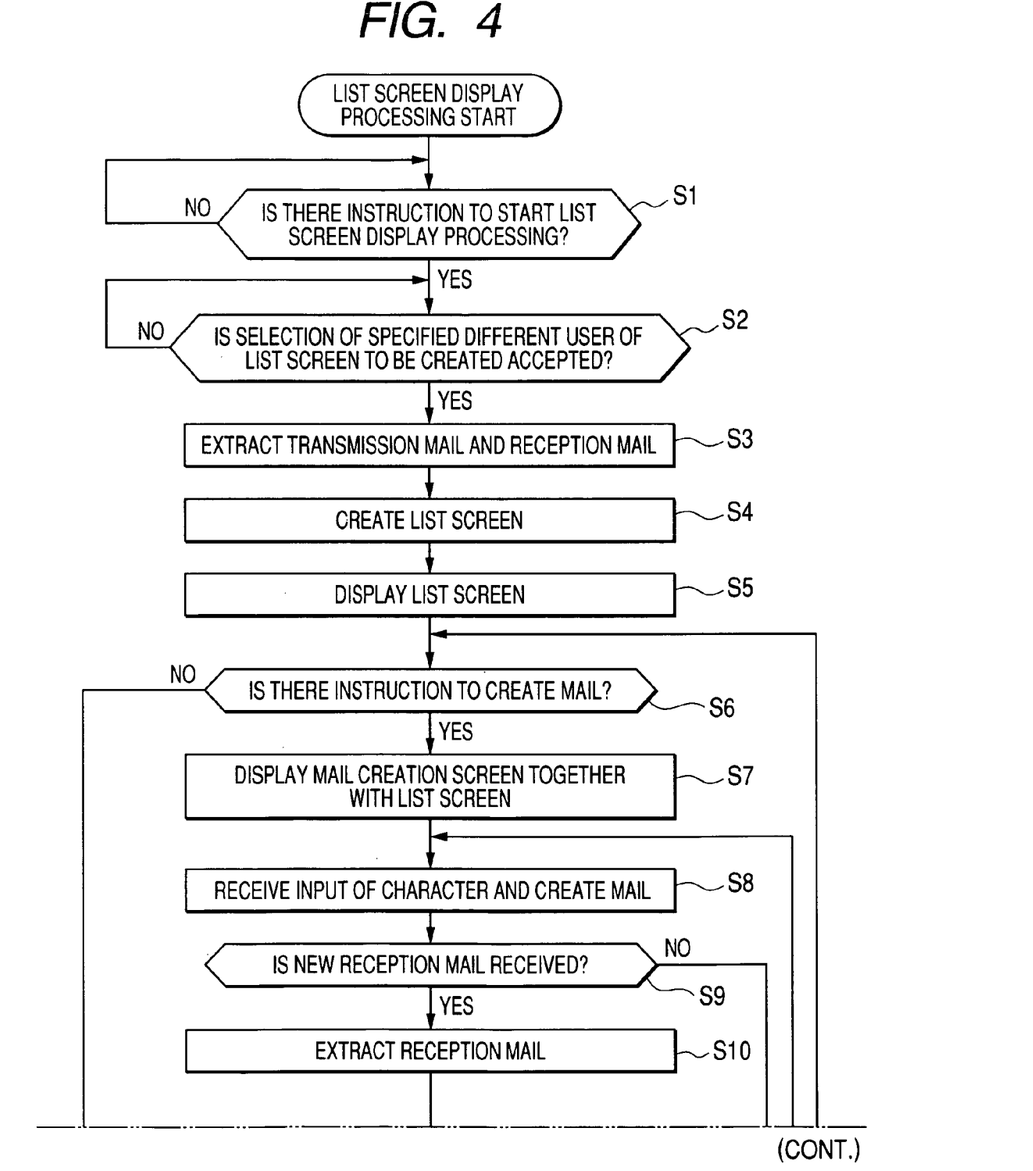
FIG. 4 is an exemplary flowchart illustrating a list screen display processing in the camera-equipped digital cellular phone of FIG. 3.

Next, a list screen display processing in the camera-equipped digital cellular phone 1 of FIG. 3 will be described with reference to a flowchart of FIG. 4. The list screen display processing starts according to an instruction to start the list screen display processing corresponding to the operation of the operating keys 14 by the user.

At Step S1, the main control unit 31 judges whether or not there is an instruction to start the list screen display processing according to the operation of the operating keys 14 by the user through the operation input control unit 33 and waits until it is judged that there is the instruction to start the list screen display processing.

At Step S1, when it is judged that there is the instruction to start the list screen display processing, at Step S2, the main control unit 31 judges through the operation input control unit 33 whether or not the selection of a person to mail of a list screen to be created, in which the transmission and reception mails with respect to a specified other user (one of different users) are arranged in time series, is accepted according to the operation of the operating keys 14 by the user through the operation input control unit 33.

For example, if the person to mail of the list screen to be created is input as Ms. A among different users according to the operation of the operating keys 14 by the user, it is judged that the selection of Ms. A is accepted as the person to mail of the list screen to be created in which the transmission and reception mails with respect to the specified other user (one of different users) are arranged in time series.

As Step S2, when it is judged that the selection of the person to mail of the list screen to be created, in which the transmission and reception mails with respect to the specified other user (one of different users) are arranged in time series, is accepted, at Step S3, the main control unit 31 extracts the transmission mails and the reception mails with respect to the specified other user (for example, Ms. A) of the list screen to be created selected by the user from a plurality of transmission and reception mails until that time stored in a transmission mail box and a reception mail box on the basis of identification information (for example, a mail address or the like) about the person to mail (for example, Ms. A or the like) of the list screen to be created selected by the user.

Accordingly, for example, when mail transmission and reception are repeatedly performed between the user and Ms. A, only transmission mails that have Ms. A as a destination and are transmitted from the user to Ms. A and reception mails that are received from Ms. A can be extracted from a plurality of transmission and reception mails until that time stored in the transmission mail box and the reception mail box. Of course, at Steps S3 and S4, when mails of a specified other user are selected so as to create a list screen, only a list of reception mails or a list of transmission mails may be extracted so as to create a list screen.

At Step S4, the main control unit 31 creates a list screen, in which the transmission and reception mails with respect to the specified other user (one of different users) are arranged in time series, using the extracted transmission and reception mails with respect to the specified other user.

At Step S5, the main control unit 31 controls the LCD control unit 36 to display the created list screen, in which the transmission and reception mails with respect to the specified other user (one of thee different users) are arranged in time series, on the liquid crystal display 17. The liquid crystal display 17 displays the created list screen, in which the transmission and reception mails with respect to the specified other user (one of thee different users) are arranged in time series, under the control of the LCD control unit 36.

Figure 5A:
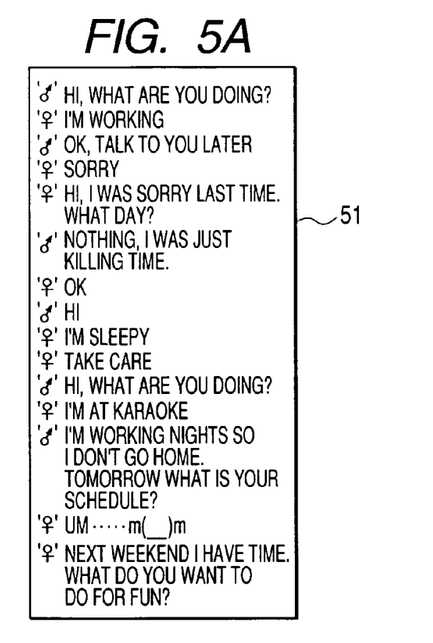
FIGS. 5A to 5D are exemplary diagrams showing a display example of a list screen to be displayed on a liquid crystal display of FIG. 3.

For example, as shown in FIG. 5A, when mail transmission and reception are repeatedly performed between the user and Ms. A, a list screen 51, in which the transmission and reception mails with respect to the specified other user (one of thee different users) are arranged in time series, is created and displayed using the transmission and reception mails with respect to the specified other user extracted from a plurality of mails.

In case of the list screen 51 of FIG. 5A, 'σ' indicates the user and '♀' represents Ms. A. As the mail exchange, 'Hi, what are you doing?', 'I'm working', 'Ok, talk to you later', and the like are sequentially from the first in time series. The list screen can display a predetermined line (for example, one line in this embodiment) as to each mail. In case that all text data can not be displayed within the predetermined lines, the list screen displays only a part of the text data within the predetermined lines. Other part of the text data is not displayed. However, after a predetermined time has passed, the list screen display may be automatically scrolled to display other part of the text thereon. Also, the user may position a cursor to the part of the text within the predetermined line so as to display other part of the text on the list screen display Accordingly, the user can take a view of how the exchange with Ms. A is performed. Then, even though the exchange of a series of mails is intermittently performed for a long time of a half year, the content of the past exchange can be instantaneously brought back to memory.

At Step S6, the main control unit 31 judges whether or not there is an instruction to create a mail according to the operation of the operating keys 14 by the user through the operation input control unit 33.

At Step S6, when it is judged that there is the instruction to create a mail according to the operation of the operating keys 14 by the user, at Step s7, the main control unit 31 controls the LCD control unit 36 and displays a mail creation screen for creating a mail, together with the created list screen, in which the transmission and reception mails with respect to the specified other user (one of thee different users) are arranged in time series.

Figure 5B:
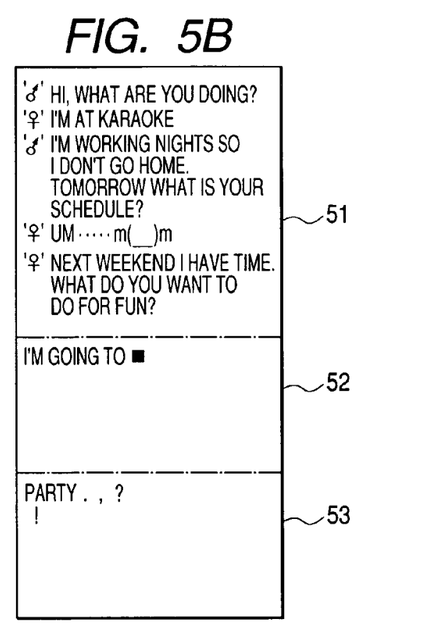

For example, as shown in FIG. 5B, below the created list screen 51, in which the transmission and reception mails with respect to the specified other user (for example, Ms. A) are arranged in time series, a mail creation screen 52 for creating a mail and an input prediction screen 53 for predicting a character input upon mail creation are simultaneously displayed.

At Step S8, the main control unit 31 receives the input of characters according to the operation of the operating keys 14 by the user through the operation input control unit 33, and creates a transmission mail to be transmitted. For example, in FIG. 5B, the input of characters 'I'm going to a party at Roppongi . . .' on the mail creation screen 52 is accepted, and 'I'm going to a party at Roppongi . . . ' is created as the transmission mail to be transmitted.

At Step S9, the main control unit 31 judges whether or not a new reception mail is received from a different camera-equipped digital cellular phone 1 through the modulation/demodulation circuit unit 39, the transmission/reception circuit unit 43, the antenna 44, and the base station (not shown).

At Step S9, when it is judged that the new reception mail is received from the different camera-equipped digital cellular phone 1, at Step S10, the main control unit 31 extracts a reception mail with respect to the specified other user (for example, Ms. A) of the list screen to be created selected by the user from reception mails newly received on the basis of identification information (for example, a mail address or the like) of the person to mail of the list screen to be created selected by the user.

At Step S11, the main control unit 31 judges whether or not the reception mail with respect to the specified other user (for example, Ms. A) of the list screen to be created selected by the user is extracted from the reception mails newly received.

At Step S11, when it is judged that the reception mail with respect to the specified other user (for example, Ms. A) of the list screen to be created selected by the user is extracted from the reception mails newly received, at Step S12, the main control unit 31 newly creates a list screen, in which transmission and reception mails with respect to the specified other user (one of different users) are arranged in time series, using the extracted new reception mail with respect to the specified other user.

At Step S13, the main control unit 31 controls the LCD control unit 36 to update the list screen, in which transmission and reception mails with respect to the specified other user (one of different users) are arranged in time series, and to display the updated list screen on the liquid crystal display 17. The liquid crystal display 17 updates and displays the list screen, in which the transmission and reception mails with respect to the specified other user (one of different users) are arranged in time series, under the control of the LCD control unit 36.

Figure 5C:
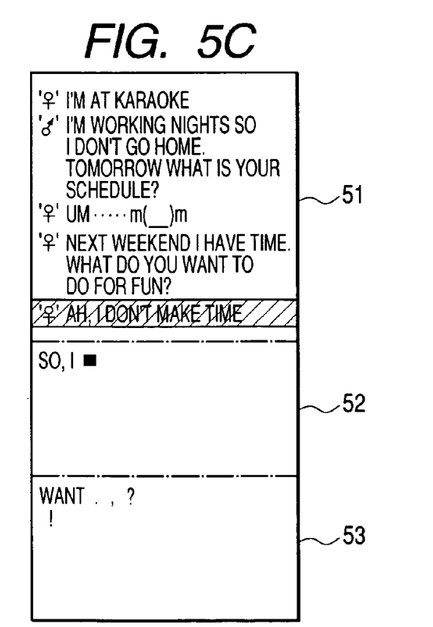

For example, as shown in FIG. 5C, a new reception mail 'Ah, I don't make time' from the specified other user (for example, Ms. A) is added, and the list screen 51 is updated and displayed. Accordingly, the user can instantaneously and easily know that a new reception mail is received from the specified other user (for example, Ms. A) of the created list screen 51. In addition, a transmission mail to be transmitted to the specified other user (for example, Ms. A) can be created by reflecting the content of the received new reception mail.

Moreover, the added new reception mail is highlighted or focused in order to indicate that it is newly received. Accordingly, the user can instantaneously and easily know that the new reception mail is received.

At Step S11, when it is judged that the reception mail with respect to the specified other user (for example, Ms. A) of the list screen to be created selected by the user is not extracted from the reception mails newly received, Steps S12 and S13 are skipped, and then the process progresses to Step S14.

At Step S9, when it is judged that the new reception mail is not received from the different camera-equipped digital cellular phone 1, Steps S10 to S13 are skipped, and then the process progresses to Step S14.

At Step S14, the main control unit 31 judges whether or not there is an instruction to transmit the created transmission mail according to the operation of the operating keys 14 by the user through the operation input control unit 33. At Step S14, when it is judged that there is no instruction to transmit the created transmission mail, the process returns to Step S8, and Steps S8 and later are executed. That is, until there is the instruction to transmit the transmission mail created by the user, the input by the characters accepted to that time is cancelled, and the input of new characters is accepted, thereby creating a desired transmission mail.

For example, as shown in FIG. 5C, according to the content of 'Ah, I don't make time' as the reception mail newly received, the user can change the content of a mail to be transmitted from 'I'm going to a party at Roppongi . . . ' to 'So . . . ', thereby creating a desired transmission mail.

At Step S14, when it is judged that there is the instruction to transmit the created transmission mail, at Step S15, the main control unit 31 controls the modulation/demodulation circuit unit 39 and the like, and transmits the created transmission mail to the camera-equipped digital cellular phone 1 of the specified other user (for example, Ms. A) through the modulation/demodulation circuit unit 39, the transmission/reception circuit unit 43, the antenna 44, and the base station (not shown).

At Step S16, the main control unit 31 newly creates the list screen, in which transmission and reception mails with respect to the specified other user (one of different users) are arranged in time series, using the extracted new transmission mail to the specified other user.

At Step S17, the main control unit 31 controls the LCD control unit 36 to update the list screen, in which the transmission and reception mails with respect to the specified other user (one of different users) are arranged in time series, and to display the updated list screen on the liquid crystal display 17. The liquid crystal display 17 updates and displays the list screen, in which the transmission and reception mails with respect to the specified other user (one of different users) are arranged in time series, under the control of the LCD control unit 36.

Figure 5D:
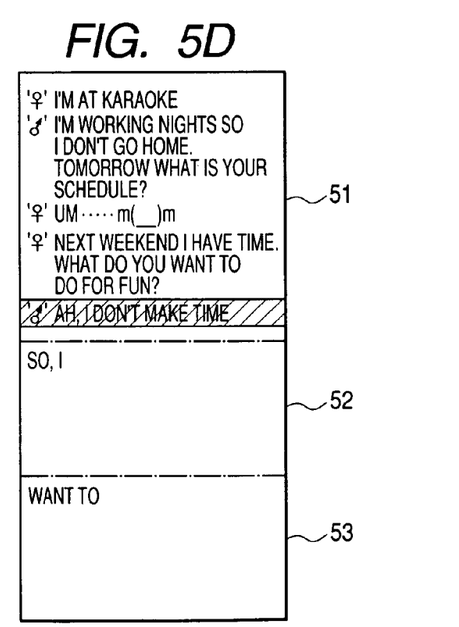

For example, as shown in FIG. 5D, a new transmission mail 'So, see you next time' to the specified other user (for example, Ms. A) is added, and the list screen 51 is updated and displayed. Moreover, the added new transmission mail is highlighted or focused in order to indicate that it is newly transmitted. Accordingly, the user can further instantaneously and easily know that the new transmission mail is transmitted to the specified other user (for example, Ms. A).

Meanwhile, at Step S6, when it is judged that is no instruction to create a mail according to the operation of the operating keys 14 by the user, the process progresses to Step S18.

At Step S18, the main control unit 31 judges whether or not there is an instruction to end the list screen display processing according to the operation of the operating keys 14 by the user through the operation input control unit 33.

At Step S18, when it is judged that there is no instruction to end the list screen display processing according to the operation of the operating keys 14 by the user, the process returns to Step S6, and Step S6 and later are repeated. Accordingly, until there is the instruction to end the list screen display processing according to the operation of the operating keys by the user, mail transmission and reception can be executed between the user and the specified other user (for example, Ms. A) while the list screen is displayed. Therefore, the user can create a next transmission mail to transmit and can perform mail transmission and reception with the specified other user (Ms. A) while viewing the list screen to be sequentially updated.

In the embodiment of the invention, the transmission and reception mails with respect to the person to mail (for example, Ms. A) of the list screen to be creased selected by the user can be extracted from a plurality of transmission and reception mails until that time stored in the transmission mail box and the reception mail box on the basis of the identification information (for example, a mail address or the like) about the person to mail (for example, Ms. A or the like) of the list screen to be created selected by the user. Further, the list screen, in which at least one of the transmission and reception mails with respect to the specified other user (for example, Ms. A) are arranged in time series, can be created and displayed using the extracted transmission and reception mails with respect to the specified other user. Accordingly, the user can take a view of how the exchange is performed with Ms. A until that time. Then, even though the exchange of a series of mails is intermittently performed for a long time of a half year, the content of the past exchange can be instantaneously brought back to memory. In addition, the user can create the transmission mail to be newly transmitted to the specified other user (for example, Ms. A) while viewing the list screen.

Therefore, when a mail function is used, operationality and convenience of the camera-equipped digital cellular phone 1 can be improved.

Moreover, the created list screen may be stored as a log. Accordingly, when the user wants to view only the history of the transmission and reception mails until that time, he/she can simply view the created list screen without performing the extraction processing and the list screen creation processing again. Hereinafter, a list screen display processing using such a method will be described.

Figure 6:
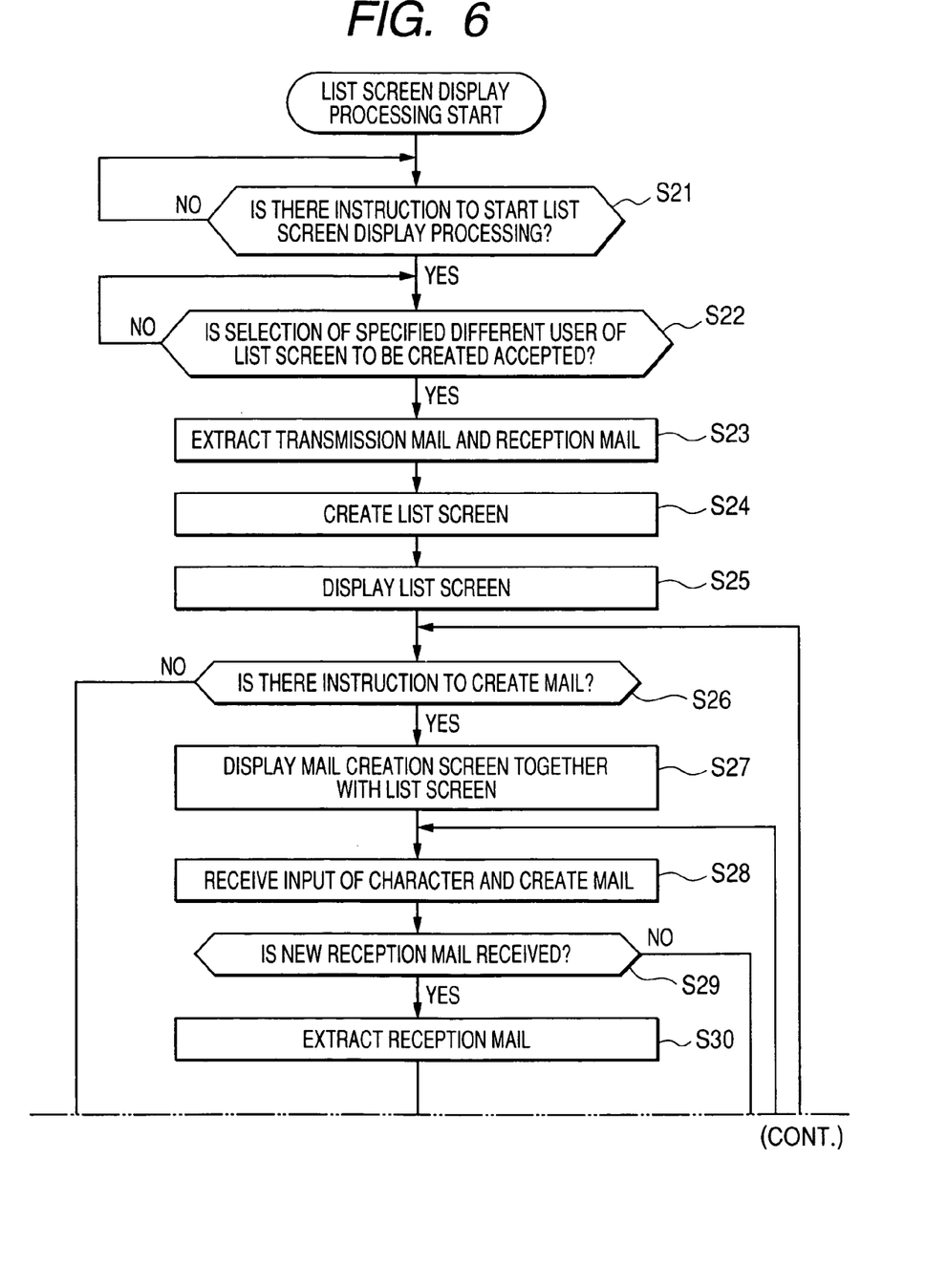
FIG. 6 is an exemplary flowchart illustrating another list screen display processing in the camera-equipped digital cellular phone of FIG. 3.

Another list screen display processing in the camera-equipped digital cellular phone 1 of FIG. 3 will be described with reference to a flowchart of FIG. 6. Moreover, Steps S21 to S37 and S39 of FIG. 6 are the same as Steps S1 to S18 of FIG. 4, and thus the descriptions thereof will be omitted.

At Step S38, the main control unit 31 stores the updated list screen in the storage unit 47. The storage unit 47 stores the updated list screen under the control of the main control unit 31. Accordingly, the list screen of the specified other user (for example, Ms. A or the like) updated according to a series of operations by the user can be stored. Therefore, when the user wants to view only the history of the transmission and reception mails until that time, he/she can simply view the created list screen, without performing the extraction processing and the list screen creation processing at Steps 23 and 24 of FIG. 6 again. As a result, when a mail function is used, operationality and convenience of the camera-equipped digital cellular phone 1 can be improved.

Moreover, when the transmission and reception mails stored in the transmission mail box and the reception mail box of the storage unit 47 are full, transmission and reception mails other than the list screen stored in the storage unit 47 are deleted, and the history of the exchange of the transmission and reception mails until that time may be preserved by only the list screen. Accordingly, at least one of the transmission mails and the reception mails, which are desired by the user, can be collectively preserved and managed. Therefore, when the mail function is used, operationality and convenience of the camera-equipped digital cellular phone 1 can be improved.

Further, if a cursor is displayed to be superimposed on the list screen displayed on the liquid crystal display 17 and the user is allowed to click (push) a desired transmission/reception mail, the transmission/reception may be opened. Of course, an attached file or a quotation may be displayed.

Although a case where mail transmission and reception between the user and a specified other user is performed has been described in the embodiment of the invention, the invention is not limited thereto. For example, the invention can be applied to a case where mail transmission and reception among three or more peoples is performed. In this case, a list screen relative to transmission and reception mails among three or more peoples is created and displayed.

Although the transmission and reception mails are arranged in time series on the list screen to be created in the embodiment of the invention, the invention is not limited thereto. For example, the transmission and reception mails may be randomly arranged in time series or may be arranged according to the size of data.

The embodiment can be applied to a PDA (Personal Digital Assistant), a personal computer, and other information processing apparatuses, in addition to the camera-equipped digital cellular phone 1.

A series of processing described in the embodiment of the invention may be executed by software or may be executed by hardware.

Although an example where the steps of the flowchart are performed in time series according to the described sequence in the embodiment of the invention, the steps may be not necessarily performed in time series. For example, the steps may be performed in parallel or individually.

According to the above-embodiments, a list screen, in which at least one of transmission mails and reception mails with a specified other user are arranged, can be created.

What is claimed is:

1. An information processing apparatus comprising:
   a central processing unit (CPU) configured to perform control of the information processing apparatus;
   a transmitting unit configured to transmit a plurality of transmission mails;
   a receiving unit configured to receive a plurality of reception mails;
   an extracting unit configured to extract transmission mails and reception mails exchanged with a specified other user from one or more mail boxes storing mails that were exchanged with other users, the transmission mails being stored as separate files in at least one of the one or more mail boxes, the reception mails being stored as separate files in at least one of the one or more mail boxes, the extraction being performed by selecting the mails having identification information that matches the specified other user selected by a user of the information processing apparatus;
   a creating unit configured to create a list screen, in which the transmission mails and the reception mails extracted by the extracting unit with respect to the specified other user are arranged in time series; and
   a display unit configured to display the list screen created by the creating unit,
   wherein, while the list screen is displayed by the display unit, when a new transmission or a new reception is executed with respect to the specified other user, the creating unit creates an updated list screen, and the display unit displays the updated list screen, and
   wherein the updated list screen created by the creating unit and displayed by the display unit is stored in a storage unit for subsequent use, thereby allowing the updated list screen to be retrieved from the storage unit and displayed by the display unit a second time in response to a user instruction subsequent to the storing of the updated list screen.

2. The information processing apparatus according to claim 1, wherein the list screen lists each mail within a predetermined line, and
   wherein, in a case in which only a part of text data of a mail is displayed on the list screen, after a predetermined time has passed, the list screen is scrolled so that the other part of the text data of the mail can be displayed.

3. The information processing apparatus according to claim 1, wherein the list screen lists each mail within a predetermined line, and
wherein, in a case in which only a part of text data of a mail is listed on the list screen within the predetermined line, when a user positions a cursor on the predetermined line, the list screen is scrolled so that the other part of the text data of the mail can be displayed.

4. An information processing apparatus comprising:
a central processing unit (CPU) configured to perform control of the information processing apparatus;
a transmitting unit configured to transmit a plurality of transmission mails;
a receiving unit configured to receive a plurality of reception mails;
an extracting unit configured to extract transmission mails and reception mails exchanged with a specified other user from one or more mail boxes storing mails that were exchanged with other users, the transmission mails being stored as separate files in at least one of the one or more mail boxes, the reception mails being stored as separate files in at least one of the one or more mail boxes, the extraction being performed by selecting the mails having identification information that matches the specified other user selected by a user of the information processing apparatus;
a creating unit configured to create a list screen, in which the transmission mails and the reception mails extracted by the extracting unit with respect to the specified other user are arranged in time series;
a display unit configured to display the list screen created by the creating unit; and
a selection accepting unit configured to accept a selection of the specified other user among a plurality of other users,
wherein the extracting unit extracts the transmission mails and the reception mails with respect to the specified other user from the plurality of transmission mails transmitted by the transmitting unit and the plurality of reception mails received by the receiving unit based on identification information of the specified other user selected by the selection accepting unit, and
wherein, while the list screen is displayed by the display unit, when a new transmission or a new reception is executed with respect to the specified other user, the creating unit creates an updated list screen, and the display unit displays the updated list screen, and
wherein the updated list screen created by the creating unit and displayed by the display unit is stored in a storage unit for subsequent use, thereby allowing the updated list screen to be retrieved from the storage unit and displayed by the display unit a second time in response to a user instruction subsequent to the storing of the updated list screen.

5. The information processing apparatus according to claim 4, wherein a new reception mail is highlighted in the updated list screen.

6. A method for an information processing apparatus, wherein the information processing apparatus comprises a transmitting unit configured to transmit a plurality of transmission mails, and a receiving unit configured to receive a plurality of reception mails, the method comprising:
extracting transmission mails and reception mails exchanged with a specified other user from one or more mail boxes storing mails that were exchanged with other users, the transmission mails being stored as separate files in at least one of the one or more mail boxes, the reception mails being stored as separate files in at least one of the one or more mail boxes, the extraction being performed by selecting the mails having identification information that matches the specified other user selected by a user of the information processing apparatus;
creating a list screen, in which the transmission mails and the reception mails extracted with respect to the specified other user are arranged in time series;
displaying the created list screen;
while the list screen is displayed, when new transmission or a new reception is executed with respect to the specified other user, creating an updated list screen and displaying the updated list screen; and
storing the updated list screen in a storage unit for subsequent use, thereby allowing the updated list screen to be retrieved from the storage unit and displayed a second time in response to a user instruction subsequent to the storing of the updated list screen.

7. The method according to claim 6, wherein the list screen lists each mail within a predetermined line, and the method further comprises:
in a case in which only a part of text data of a mail is displayed on the list screen, after a predetermined time has passed, scrolling the list screen so that the other part of the text data of the mail can be displayed.

8. The method according to claim 6, wherein the list screen lists each mail within a predetermined line, and the method further comprises:
in a case in which only a part of text data of a mail is listed on the list screen within the predetermined line, when a user positions a cursor on the predetermined line, scrolling the list screen so that the other part of the text data of the mail can be displayed.

9. The method according to claim 6, wherein a new reception mail is highlighted in the updated list screen.

10. The method according to claim 6, further comprising storing the displayed list screen.

* * * * *